(12) United States Patent
Tung-Ke

(10) Patent No.: US 8,432,681 B2
(45) Date of Patent: Apr. 30, 2013

(54) REMOVABLE VIBRATION-RESISTANT TRAY

(75) Inventor: Lu Tung-Ke, Taipei (TW)

(73) Assignee: Giga-Byte Technology Co., Ltd., New Taipei County (TW)

( * ) Notice: Subject to any disclaimer, the term of this patent is extended or adjusted under 35 U.S.C. 154(b) by 103 days.

(21) Appl. No.: 12/962,260

(22) Filed: Dec. 7, 2010

(65) Prior Publication Data
US 2012/0138493 A1   Jun. 7, 2012

(51) Int. Cl.
*G06F 1/16*   (2006.01)
*H05K 5/00*   (2006.01)
*H05K 7/00*   (2006.01)

(52) U.S. Cl.
USPC ............. 361/679.36; 361/679.33; 361/679.34

(58) Field of Classification Search . 361/679.33–679.45
See application file for complete search history.

(56) References Cited

U.S. PATENT DOCUMENTS

| | | | | |
|---|---|---|---|---|
| 1,876,640 A | * | 9/1932 | Dobson | 248/635 |
| 4,683,520 A | * | 7/1987 | Grassens et al. | 361/825 |
| 4,713,714 A | * | 12/1987 | Gatti et al. | 360/137 |
| 4,979,062 A | * | 12/1990 | Stefansky et al. | 360/97.13 |
| 5,131,619 A | * | 7/1992 | Daugherty et al. | 248/635 |
| 5,535,092 A | * | 7/1996 | Bang | 361/679.34 |
| 5,668,791 A | * | 9/1997 | Yamada et al. | 720/693 |
| 6,005,768 A | * | 12/1999 | Jo | 361/679.34 |
| 6,021,041 A | * | 2/2000 | Genix et al. | 361/679.34 |
| 6,122,165 A | * | 9/2000 | Schmitt et al. | 361/679.31 |
| 6,249,504 B1 | * | 6/2001 | Iwanaga | 720/692 |
| 6,292,455 B1 | * | 9/2001 | Saruwatari et al. | 720/692 |
| 6,378,832 B1 | * | 4/2002 | Li et al. | 248/637 |
| 6,616,106 B1 | * | 9/2003 | Dean et al. | 248/27.1 |
| 6,646,977 B2 | * | 11/2003 | Chen et al. | 720/692 |
| 6,671,124 B2 | * | 12/2003 | Guion et al. | 360/97.19 |
| 6,762,932 B2 | * | 7/2004 | Regimbal et al. | 361/679.33 |
| 6,882,528 B2 | * | 4/2005 | Chuang | 361/679.35 |
| 7,016,189 B2 | * | 3/2006 | Lin | 361/679.34 |
| 7,137,767 B2 | * | 11/2006 | Franke et al. | 411/401 |
| 7,363,640 B2 | * | 4/2008 | Wang et al. | 720/657 |
| 7,369,402 B2 | * | 5/2008 | Huang | 361/679.33 |
| 7,548,418 B2 | * | 6/2009 | Martin et al. | 361/679.37 |
| 7,639,490 B2 | * | 12/2009 | Qin et al. | 361/679.34 |
| 7,839,639 B2 | * | 11/2010 | Najbert | 361/695 |
| 8,004,830 B2 | * | 8/2011 | Lu | 361/679.33 |
| 2002/0051338 A1 | * | 5/2002 | Jiang et al. | 361/685 |
| 2002/0101713 A1 | * | 8/2002 | Eland | 361/686 |
| 2003/0174464 A1 | * | 9/2003 | Funawatari et al. | 361/685 |
| 2004/0032711 A1 | * | 2/2004 | Kaczeus et al. | 361/685 |
| 2004/0228073 A1 | * | 11/2004 | Chuang | 361/679 |
| 2005/0088778 A1 | * | 4/2005 | Chen et al. | 360/97.02 |
| 2005/0237709 A1 | * | 10/2005 | Huang | 361/685 |
| 2007/0297129 A1 | * | 12/2007 | Liu et al. | 361/685 |
| 2008/0158808 A1 | * | 7/2008 | Camarena et al. | 361/685 |

* cited by examiner

*Primary Examiner* — Adrian S Wilson
(74) *Attorney, Agent, or Firm* — Chun-Ming Shih

(57) ABSTRACT

A vibration-resistant tray for carrying an electronic device includes a bracket, two arms and a plurality of fastening devices. The bracket includes a pair of parallel side plates. Each side plate has two first connecting sheets at opposite ends thereof. The two arms are provided to be attached onto opposite sides of the electronic device. Each of the arms has two second connecting sheets at opposite ends thereof and corresponding to the first connecting sheets. Each of the fastening devices includes a connecting member and a shock-proof washer. The shock-proof washer is mounted around the connecting member. Each of the first connecting sheets is engaged with the respective connecting member. Each of the second connecting sheets is engaged with the respective shock-proof washer. Additionally, each of the side plates of the bracket is spaced apart from the adjacent one of the arms.

13 Claims, 6 Drawing Sheets

REMOVABLE VIBRATION-RESISTANT TRAY

BACKGROUND OF INVENTION

1. Field of Invention

The present invention relates to a removable tray for carrying an electronic device, such as a hard disk drive or an optical disk drive, and pertains particularly to a removable tray that is vibration-resistant.

2. Related Prior Art

To provide vibration and shock resistance, some traditional trays are equipped with a number of elastic metal sheets on opposite side walls thereof to abut against the electronic device. However, the result in vibration resistance is merely adequate.

Also, a conventional shock absorption structure is disposed in between a fan and a computer casing and includes a screw and a shock-proof washer mounted around the screw. The washer has an I-shaped cross section. By virtue of the washer, the transfer of vibration from the fan to the casing can be reduced or eliminated. However, the shock absorption structure is securely screwed onto the casing and is irremovable.

Another shock absorption device equipped in a hard disk tray is disclosed. In that hard disk tray, a number of L-shaped plates are employed and mounted on inner walls of a tray body of the hard disk tray. The L-shaped plates are arranged in a lower position for upholding a hard disk drive. Moreover, a number of elastic shock-proof washers and screws are included in the hard disk tray and disposed on the L-shaped plates. The screws are passed through the washers and used to fasten the L-shaped plates onto the hard disk drive. As such, however, the vibration resistance is relatively poor since vibration can be easily transferred from the tray body to the hard disk drive via the L-shaped plates and the screws.

SUMMARY OF INVENTION

It is the primary object of the present invention to provide a removable vibration-resistant tray for carrying an electronic device, such as a hard disk drive or an optical disk drive. Generally, the vibration-resistant tray includes a bracket, two arms and a plurality of fastening devices.

The bracket includes a pair of side plates in parallel to each other. The two side plates are provided for being slid into a pair of guiding slots defined in inner walls of a casing. Each of the side plates has two first connecting sheets at opposite ends thereof. One of the two side plates has its two connecting sheets located right opposite to that of the other side plate. The two arms are situated between the two side plates of the bracket to be attached onto the lateral sides of the electronic device. Each of the arms has two second connecting sheets at opposite ends thereof and corresponding to the first connecting sheets. Those fastening devices are provided for engagement of the first connecting sheets and the second connecting sheets respectively. Each of the fastening devices includes a connecting member and a shock-proof washer. The connecting member has a body and a joining section extended from the body. The shock-proof washer is mounted around the body of the connecting member.

Moreover, each of the first connecting sheets of the bracket is engaged with the respective joining section of the connecting member. Each of the second connecting sheets of the arms is engaged with the respective shock-proof washer. Also, each of the side plates of the bracket is spaced apart from the adjacent arm. In this fashion, vibration or shock generated from the casing can be reduced or blocked outside the electronic device as a result of the shock-proof washer and the gap defined between the bracket and the arms.

Preferably, each of the shock-proof washers of the fastening devices defines an annular groove in a peripheral surface thereof. Each of the second connecting sheets of the arms has a notch defined in an edge thereof; and the edge of the second connecting sheet is partially embedded in the respective annular groove of the shock-proof washer.

Preferably, each of the first connecting sheets of the bracket defines a threaded hole therein; and the joining section of the connecting member is threaded for being screwed into the respective threaded hole of the first connecting sheet.

In an alternate embodiment, the aforementioned two arms may be replaced by a carrier board. The carrier board is provided to be attached on the bottom surface of the electronic device. The side edges of the carrier board are arranged corresponding to the two side plates of the bracket and each of the side edges is formed with two second connecting sheets at corresponding ends. The second connecting sheets are arranged corresponding to the first connecting sheets. It is noted that the second connecting sheets are substantially identical to the aforementioned second connecting sheets in the first embodiment and will be omitted therein further.

Compared to the prior art, the present invention utilizes the bracket, the arms, the fastening devices with the elastic washers, and the gaps defined between the bracket and the arms all together to efficiently block vibration from being transferred from the casing to the electronic device and ensure that the electronic device can function well without being affected by the outside vibration or shock.

Further features and advantages of the present invention will be appreciated by review of the following detailed description of the invention.

BRIEF DESCRIPTION OF DRAWINGS

The invention is illustrated by the accompanying drawings in which corresponding parts are identified by the same numerals and in which.

DETAILED DESCRIPTION OF EMBODIMENTS

Figure 1:
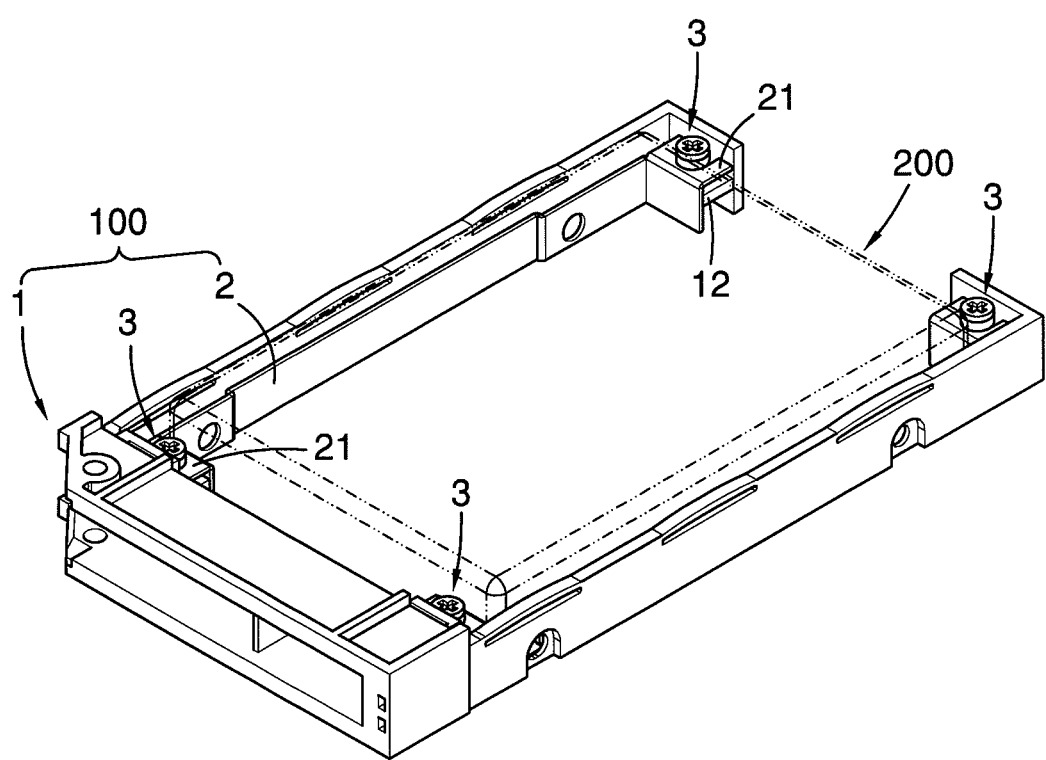
FIG. 1 is a perspective view of a removable tray in accordance with one embodiment of the invention.

With reference to FIG. 1, there is provided with a removable tray 100 in accordance with one embodiment of the present invention. The tray 100 is applied for carrying an electronic device 200, such as a hard disk drive or an optical disk drive, and is constructed to be slid into a computer casing or a server casing and be detached from the casing if necessary.

Figure 2:
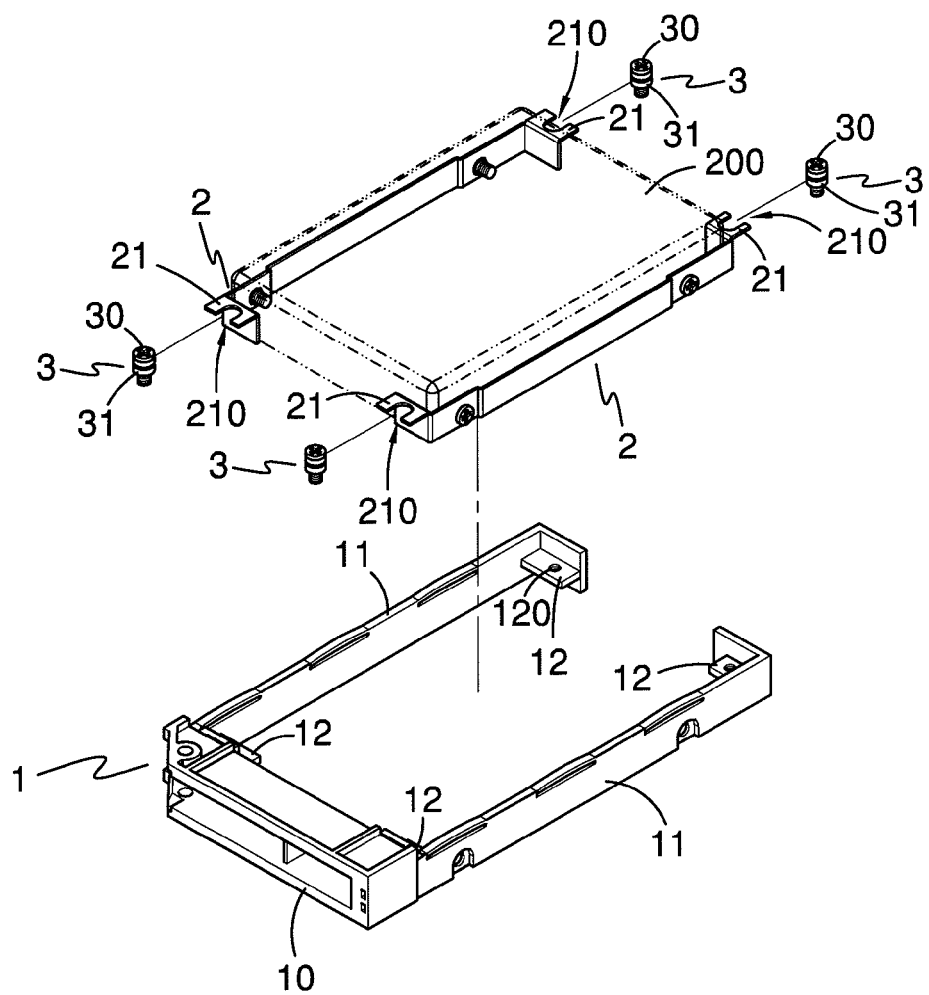
FIG. 2 is an exploded view of the removable tray of FIG. 1.

As shown in FIG. 2, the tray 100 includes a bracket 1, two arms 2 and a plurality of fastening devices 3. The bracket 1 has a body 10 and a pair of parallel side plates 11 extending from the body 10. Each of the side plates 11 has two first connecting sheets 12 at opposite ends thereof; and one of the two side plates 11 has its two connecting sheets 12 located right opposite to that of the other side plate 11. In this embodiment, the two side plates 11 of the bracket 1 are formed with, but not limited to, solid rails for being fed into the corresponding grooves or track defined in opposite inner walls of the casing. In other examples, the rails may be replaced by guiding grooves corresponding to rails of a casing.

The two arms 2 are situated between the two side plates 11 of the bracket 1 to be attached onto opposite sides of the electronic device 200. Each of the arms 2 has two second connecting sheets 21 at opposite ends thereof and the second connecting sheets 21 correspond to the first connecting sheets 12.

Each of the fastening devices 3 includes a connecting member 30 and a shock-proof washer 31 mounted around the connecting member 30. The shock-proof washer 31 is an elastic rubber washer that is an effective solution for shock absorption and vibration damping. However, the material of the shock-proof washer 31 is not limited thereto and may be a spring instead.

Figure 3:
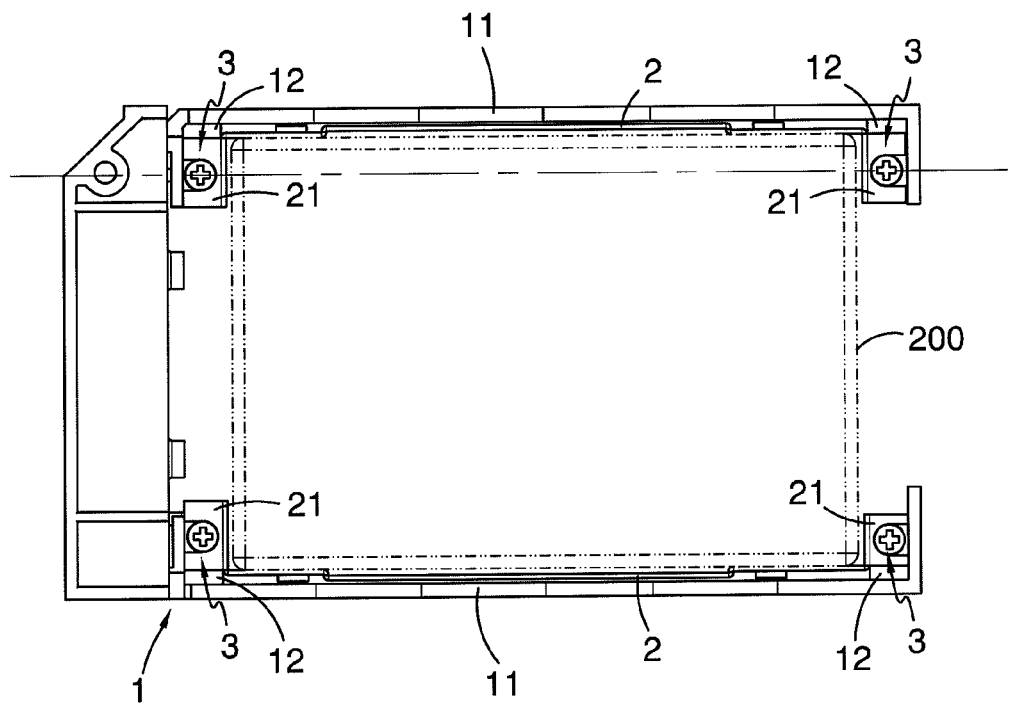
FIG. 3 is a top view of the removable tray of FIG. 1.
Figure 4:
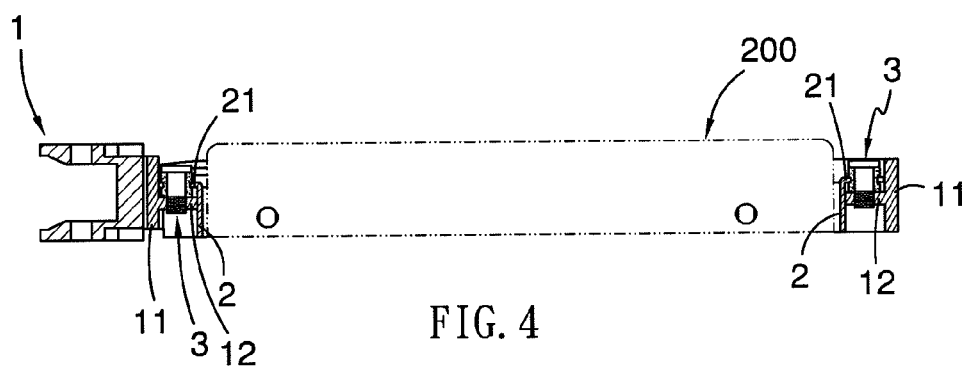
FIG. 4 is a cross section of the removable tray of FIG. 1.

As shown in FIGS. 1, 3 and 4, the bracket 1 and the two arms 2 are assembled together with the help of those fastening devices 3. Each first connecting sheet 12 of the bracket 1 corresponds to one of the second connecting sheets 21 of the two arms 2. That is, the first connecting sheets 12 on the top and the second connecting sheets 21 below are coupled together by the respective fastening devices 3. Furthermore, there is no physical contact between the bracket 1 and the arms 2. As shown in FIG. 3, each of the side plates 11 of the bracket 1 is spaced apart from the adjacent one of the arms 2 by a distance around 0.5 mm to 1 mm. Thus, vibration energy from the casing to the bracket 1 may not be further passed on to the electronic device 200 via the two arms 2.

Figure 5:
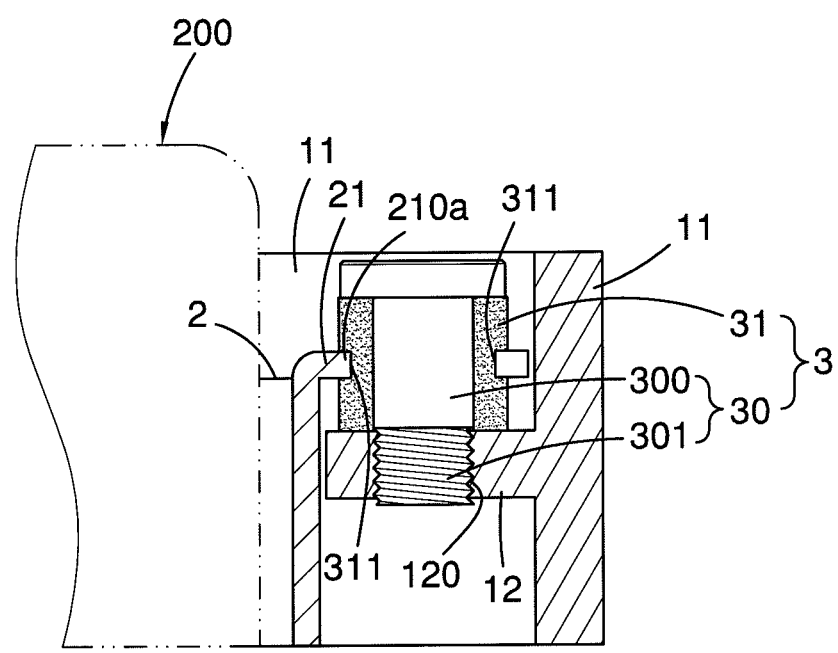
FIG. 5 is a partial enlarged view of the removable tray in FIG. 4.

FIG. 5 illustrates that one of the fastening devices 3 connects one of the first connecting sheets 12 and the respective one of the second connecting sheets 21. In this embodiment, the connecting member 30 of the fastening device 3 is a screw having a body 300 and a joining section 301 extended from the body 300. The shock-proof washer 31 is mounted around the body 300 of the screw or connecting member 30. The first connecting sheet 12 of the bracket 1 is engaged with the joining section 301 of the connecting member 30 respectively. The second connecting sheet 21 of the arm 2 is engaged with the shock-proof washer 31 respectively.

In this embodiment, the shock-proof washer 31 of each of the fastening devices 3 defines an annular groove 311 in a peripheral surface thereof. Each of the second connecting sheets 21 of the arms 2 has a U-shaped or C-shaped notch 210 defined in the edge 210a thereof, as depicted in FIGS. 2 and 5. The edge 210a of the second connecting sheet 21, which surrounds the notch 210, is partially embedded in the annular groove 311 of the shock-proof washer 31 respectively. Thus the shock-proof washer 31 is clamping the edge 210a of the second connecting sheets 21. In addition, each of the first connecting sheets 12 of the bracket 1 defines a threaded hole 120 therein. The joining section 301 of the connecting member 30 of each of the fastening devices 3 is threaded for being screwed into the respective threaded hole 120 of the first connecting sheet 12.

As best seen in FIG. 5, the shock-proof washer 31 not only separates the second connecting sheet 21 from the first connecting sheet 12 but also separates the second connecting sheet 21 from the connecting member 30. In this way, when the bracket 1 together with the casing is shocked for a variety of reasons, the transfer of vibration from the bracket 1 to the two arms 2 and the electronic device 100 can be reduced or eliminated. Moreover, since each of the side plates 1 of the bracket 1 are kept apart from the adjacent arms 2 and the shock-proof washer 31 can absorb the vibration, there is no vibration transfer path created from the bracket 1 to the arms 2. Thus, by virtue of the shock-proof washer 31 as well as the gaps between the side plates 11 and the arms 2, the transfer of vibration merely occurs from the casing to the bracket 1, but not (or little) to the electronic device 200.

Figure 6:
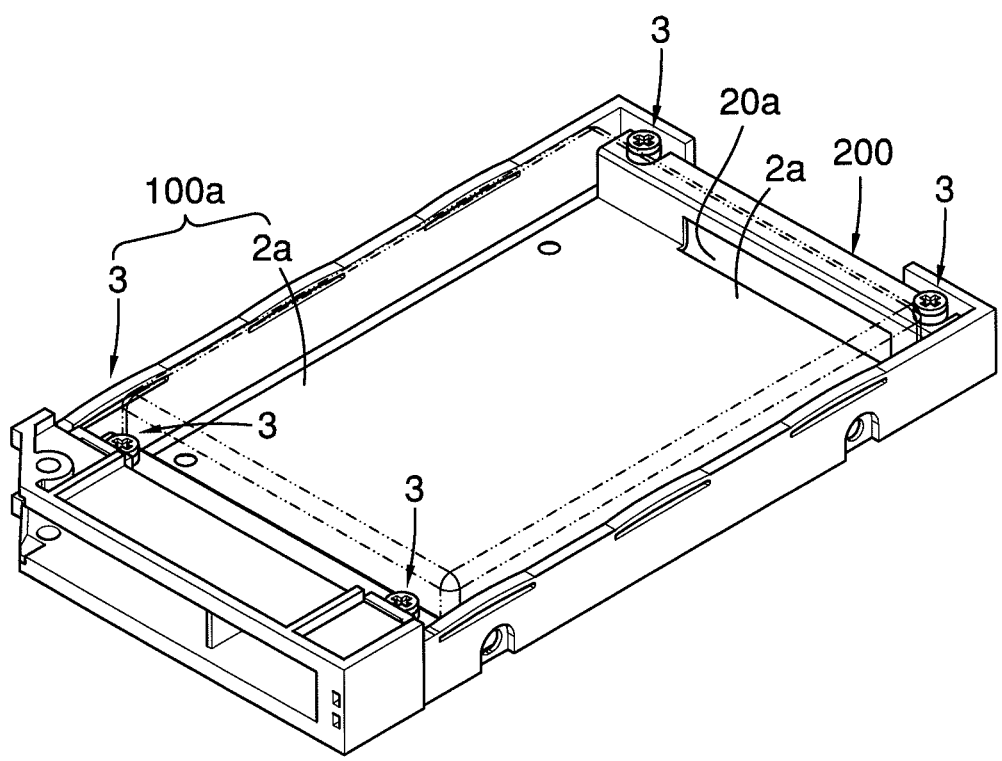
FIG. 6 is a perspective view of a removable tray in accordance with another embodiment of the invention.
Figure 7:
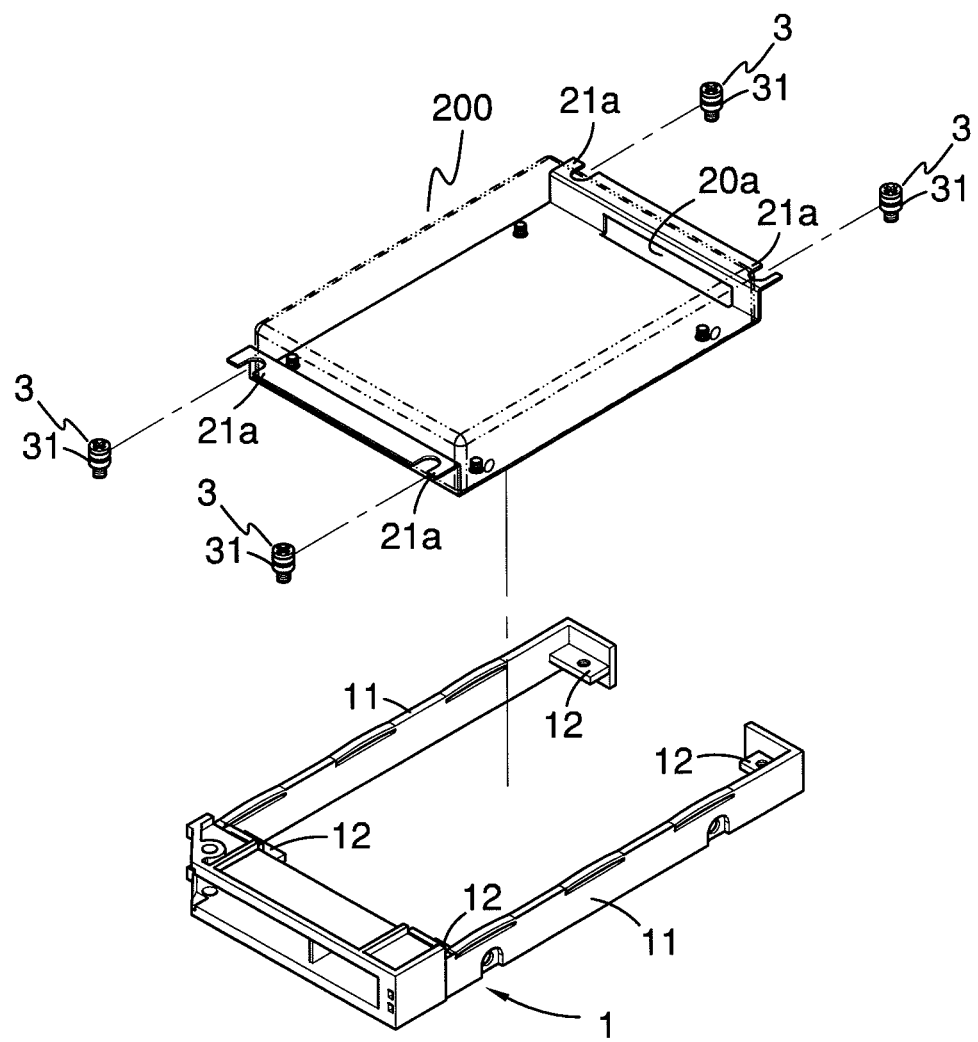
FIG. 7 is an exploded view of the removable tray of FIG. 6.

FIGS. 6 and 7 provide perspective and explosive views of a removable tray 100a in an alternate embodiment. The tray 100a includes a bracket 1, a carrier board 2a and a plurality of fastening devices 3. The bracket 1 and the fastening devices 3 herein are similar to that of the aforementioned embodiment. The carrier board 2a is situated between the two side plates 11 of the bracket 1 to be attached onto a bottom surface of the electronic device 200 by screws. The carrier board 2a has two side edges corresponding to the two side plates 11 of the bracket 1. Each of the side edges of the carrier board 2a is formed with two second connecting sheets 21a at front and rear ends thereof. Similar to the second connecting sheets 21 of FIG. 2, the second connecting sheets 21a of this embodiment are corresponding to the first connecting sheets 12 of the side plates 11 and will not be discussed herein further. Similar to the aforementioned embodiment, the shock washer 31 of each of the fastening devices 3 and the gap defined in between the bracket 1 and the side edges of carrier board 2a, as shown in FIGS. 6 and 7, are employed to reduce or eliminate the transfer of vibration from the casing or the bracket 1 to the electronic device 200. In particular, the carrier board 2a defines an aperture 20a in a rear side thereof for passing through of a connector of the electronic device 200.

It will be appreciated that although a particular embodiment of the invention has been shown and described, modifications may be made. It is intended in the claims to cover such modifications which come within the spirit and scope of the invention.

The invention claimed is:

1. A vibration-resistant tray for carrying an electronic device and for being slid into a casing, the tray comprising:
    a bracket including a pair of side plates in parallel to each other; each of the side plates having two first connecting sheets disposed at opposite ends thereof and having an inner surface facing to each other;
    two arms being respectively attached onto opposite side walls of the electronic device and each of the arms situated between the side wall of the electronic device and the inner surface of one of the side plates of the bracket; each of the arms having two second connecting sheets at opposite ends thereof and the two second connecting sheets corresponding to the first connecting sheets of the side plates of the bracket; and
    a plurality of fastening devices engaging the first connecting sheets of the bracket and the second connecting sheets of the arms correspondingly; each of the fastening devices including a connecting member and a shock-proof washer; the connecting member having a body and a joining section extending from the body; the shock-proof washer being mounted around the body of the connecting member;
    wherein each of the first connecting sheets of the bracket is engaged with the joining section of the connecting member of the corresponding fastening device; each of the second connecting sheets of the arms is engaged with the shock-proof washer of the corresponding fastening device; and each of the side plates of the bracket is spaced apart from the adjacent one of the arms.

2. The vibration-resistant tray of claim 1, wherein the shock-proof washer defines an annular groove in a peripheral surface thereof; each of the second connecting sheets of the arms has a notch defined in an edge thereof; and the edge of the second connecting sheet is partially embedded in the annular groove of the shock-proof washer respectively.

3. The vibration-resistant tray of claim 2, wherein each of the first connecting sheets of the bracket defines a threaded hole therein; and the joining section of the connecting member is threaded for being screwed into the threaded hole of the first connecting sheet respectively.

4. The vibration-resistant tray of claim 1, wherein each of the side plates of the bracket has a rail on an outer surface thereof to be fed into a groove defined in one of opposite inner walls of the casing correspondingly.

5. A vibration-resistant tray for carrying an electronic device and for being slid into a casing with the electronic device carried thereby, the tray comprising:
- a bracket including a body and a pair of parallel side plates, and each of the side plates having two opposite ends each formed with a first connecting sheet; one of the ends of each of the side plates connected to the body, and the other end of each of the side plates being a suspended end;
- a carrier board being attached onto a bottom surface of the electronic device and situated between the two side plates of the bracket; the carrier board having two side edges each formed with two second connecting sheets corresponding to the first connecting sheets of the side plates of the bracket; and
- a plurality of fastening devices provided engaging the first connecting sheets of the bracket and the second connecting sheets of the carrier board correspondingly; each of the fastening devices including a connecting member and a shock-proof washer; the connecting member having a body and a joining section extending from the body; the shock-proof washer being mounted around the body of the connecting member;
- wherein each of the first connecting sheets of the bracket is engaged with the joining section of the connecting member of the corresponding fastening device; each of the second connecting sheets of the carrier board is engaged with the shock-proof washer of the corresponding fastening device; and each of the side plates of the bracket is spaced apart from the adjacent edge of the carrier board.

6. The vibration-resistant tray of claim 5, wherein the shock-proof washer defines an annular groove in a peripheral surface thereof; each of the second connecting sheets of the carrier board has a notch defined in an edge thereof; and the edge of the second connecting sheet is partially embedded in the annular groove of the shock-proof washer respectively.

7. The vibration-resistant tray of claim 6, wherein each of the first connecting sheets of the bracket defines a threaded hole therein; and the joining section of the connecting member is threaded for being screwed into the threaded hole of the first connecting sheet respectively.

8. The vibration-resistant tray of claim 7, wherein the carrier board defines an aperture in a rear side thereof for passing through of a connector of the electronic device.

9. The vibration-resistant tray of claim 5, wherein each of the side plates of the bracket has a rail on an outer surface thereof to be fed into a groove defined in one of opposite inner walls of the casing correspondingly.

10. The vibration-resistant tray of claim 5, wherein each of the side plates of the bracket has a guiding groove on an outer surface thereof to enable a rail disposed on one of opposite inner walls of the casing to be fed into correspondingly.

11. The vibration-resistant tray of claim 5, wherein each of the second connecting sheets is situated on the top of a top surface of the corresponding first connecting sheet of the bracket, and a bottom surface of each of the first connecting sheets is on a level higher than the bottom surface of the electronic device.

12. The vibration-resistant tray of claim 1, wherein each of the side plates of the bracket has a guiding groove on an outer surface thereof to enable a rail disposed on one of opposite inner walls of the casing to be fed into correspondingly.

13. The vibration-resistant tray of claim 1, wherein each of the second connecting sheets extends from a top edge of the arms and is situated on the top of the corresponding first connecting sheet of the bracket.

\* \* \* \* \*